(12) United States Patent
Roth (10) Patent No.: US 10,148,430 B1
(45) Date of Patent: Dec. 4, 2018

(54) REVOCABLE STREAM CIPHERS FOR UPGRADING ENCRYPTION IN A SHARED RESOURCE ENVIRONMENT

(71) Applicant: Amazon Technologies, Inc., Reno, NV (US)

(72) Inventor: Gregory Branchek Roth, Seattle, WA (US)

(73) Assignee: Amazon Technologies, Inc, Reno, NV (US)

( * ) Notice: Subject to any disclaimer, the term of this patent is extended or adjusted under 35 U.S.C. 154(b) by 546 days.

(21) Appl. No.: 13/865,057

(22) Filed: Apr. 17, 2013

(51) Int. Cl.
*H04L 9/08* (2006.01)
*H04L 9/32* (2006.01)

(52) U.S. Cl.
CPC .................. *H04L 9/0819* (2013.01)

(58) Field of Classification Search
CPC ....... H04L 9/0819; H04L 9/0891; H04L 9/08; H04L 2209/24; H04L 2463/061; H04L 63/0457; H04L 63/06; H04W 12/04; H04N 21/63345
USPC ....................................................... 380/277
See application file for complete search history.

(56) References Cited

U.S. PATENT DOCUMENTS

| | | | | |
|---|---|---|---|---|
| 5,404,404 A | * | 4/1995 | Novorita | 380/271 |
| 6,891,950 B1 | * | 5/2005 | Oomori et al. | 380/44 |
| 8,295,492 B2 | * | 10/2012 | Suarez et al. | 380/286 |
| 8,340,300 B2 | * | 12/2012 | Lin | 380/278 |
| 8,370,648 B1 | * | 2/2013 | Natanzon | H04L 63/068 380/277 |
| 9,071,421 B2 | * | 6/2015 | Oney et al. | |
| 2003/0112977 A1 | * | 6/2003 | Ray | H04L 63/0428 380/270 |
| 2004/0073790 A1 | * | 4/2004 | Ateniese | G06F 21/606 713/165 |
| 2004/0111625 A1 | * | 6/2004 | Duffy et al. | 713/186 |
| 2005/0226407 A1 | * | 10/2005 | Kasuya et al. | 380/28 |
| 2006/0165233 A1 | * | 7/2006 | Nonaka | G06F 21/10 380/44 |
| 2007/0150731 A1 | * | 6/2007 | Ohkoshi et al. | 713/168 |
| 2008/0059787 A1 | * | 3/2008 | Hohenberger | H04L 9/3013 713/153 |
| 2008/0212770 A1 | * | 9/2008 | Satou | H04L 9/0637 380/44 |
| 2009/0013183 A1 | * | 1/2009 | Sato | G06F 21/10 713/169 |

(Continued)

*Primary Examiner* — Lynn D Feild
*Assistant Examiner* — Abdullah Almamun
(74) *Attorney, Agent, or Firm* — Hogan Lovells US LLP (57) ABSTRACT

Encryption of data across an environment, such as a shared resource environment, can be updated using keys generated using one or more revocable stream cipher algorithms. Data stored in the environment can be encrypted under a first key, or other such secret. When it is desired to update the encryption, a second key can be generated under which the data is to be re-encrypted. Instead of distributing the second key, a revocable stream cipher generator can generate an intermediate key based on the first and second keys, that when processed with the first key will produce the second key. Such an approach enables data to be re-encrypted under the second key without distributing the second key. Further, the unencrypted data will not be exposed in the process. In some embodiments, the re-encryption can be performed on an as-needed basis in order to reduce processing requirements.

26 Claims, 5 Drawing Sheets

(56) References Cited

U.S. PATENT DOCUMENTS

| | | | |
|---|---|---|---|
| 2009/0077644 A1* | 3/2009 | Hammell | H04L 63/0815 726/7 |
| 2009/0125719 A1* | 5/2009 | Cochran | G06Q 30/02 713/171 |
| 2009/0177888 A1* | 7/2009 | Asano | H04L 9/3073 713/171 |
| 2010/0008498 A1* | 1/2010 | Shirai et al. | 380/44 |
| 2010/0169639 A1* | 7/2010 | Jeffries | G06Q 10/10 713/153 |
| 2010/0316219 A1* | 12/2010 | Boubion et al. | 380/259 |
| 2011/0110519 A1* | 5/2011 | Suzaki et al. | 380/255 |
| 2012/0260090 A1* | 10/2012 | Hauck | H04L 63/0853 713/168 |
| 2013/0212392 A1* | 8/2013 | Nagarajan et al. | 713/171 |
| 2014/0050318 A1* | 2/2014 | Hayashi | H04L 9/3073 380/46 |
| 2014/0068260 A1* | 3/2014 | Oney et al. | 713/168 |
| 2014/0189853 A1* | 7/2014 | Epp | G06F 21/10 726/18 |
| 2015/0033037 A1* | 1/2015 | Lidman | 713/193 |
| 2015/0067330 A1* | 3/2015 | Khan | H04L 9/3013 713/168 |

\* cited by examiner

REVOCABLE STREAM CIPHERS FOR UPGRADING ENCRYPTION IN A SHARED RESOURCE ENVIRONMENT

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

Such access comes with some risk for customers, as the customers are turning over control of access to their data. In order to prevent this data from being accessed by an undesired party, many resource providers utilize encryption such that even if the data is obtained it will be difficult for the obtaining party to decrypt the data. In order to improve security, these keys are often rotated such that if one of the keys is obtained by an undesired party, that key will be useful only for a limited period of time. Unfortunately, for large, distributed systems it can be difficult to frequently rotate keys, particularly where the data encrypted under those keys has to be transmitted, decrypted, and re-encrypted each time a key is updated.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing security in an electronic environment. In particular, approaches in accordance with various embodiments utilize one or more revocable stream cipher algorithms to generate intermediate or "upgrade" keys for encrypting data objects. A given data object can be encrypted under an old or existing key, among other potential secrets. When it is desired to update the key used for the encryption, as may be part of a key rotation process, a revocable stream cipher generator can determine and/or receive a new key to be used, and generate an intermediate key based on the existing key and the new key. The intermediate key then can be distributed to any appropriate component storing, or otherwise providing access to, data encrypted under the existing key. Those components can use the intermediate key with a revocable stream cipher process to cause the data to be encrypted under the new key, without ever exposing the unencrypted data. Further, the new key was never distributed, which helps to maintain security across the environment. In at least some embodiments, the re-encrypting of data can be performed on an as-needed basis, in order to reduce processing requirements.

Various other combinations and variations are also presented in accordance with the embodiments described and suggested herein.

Figure 1:
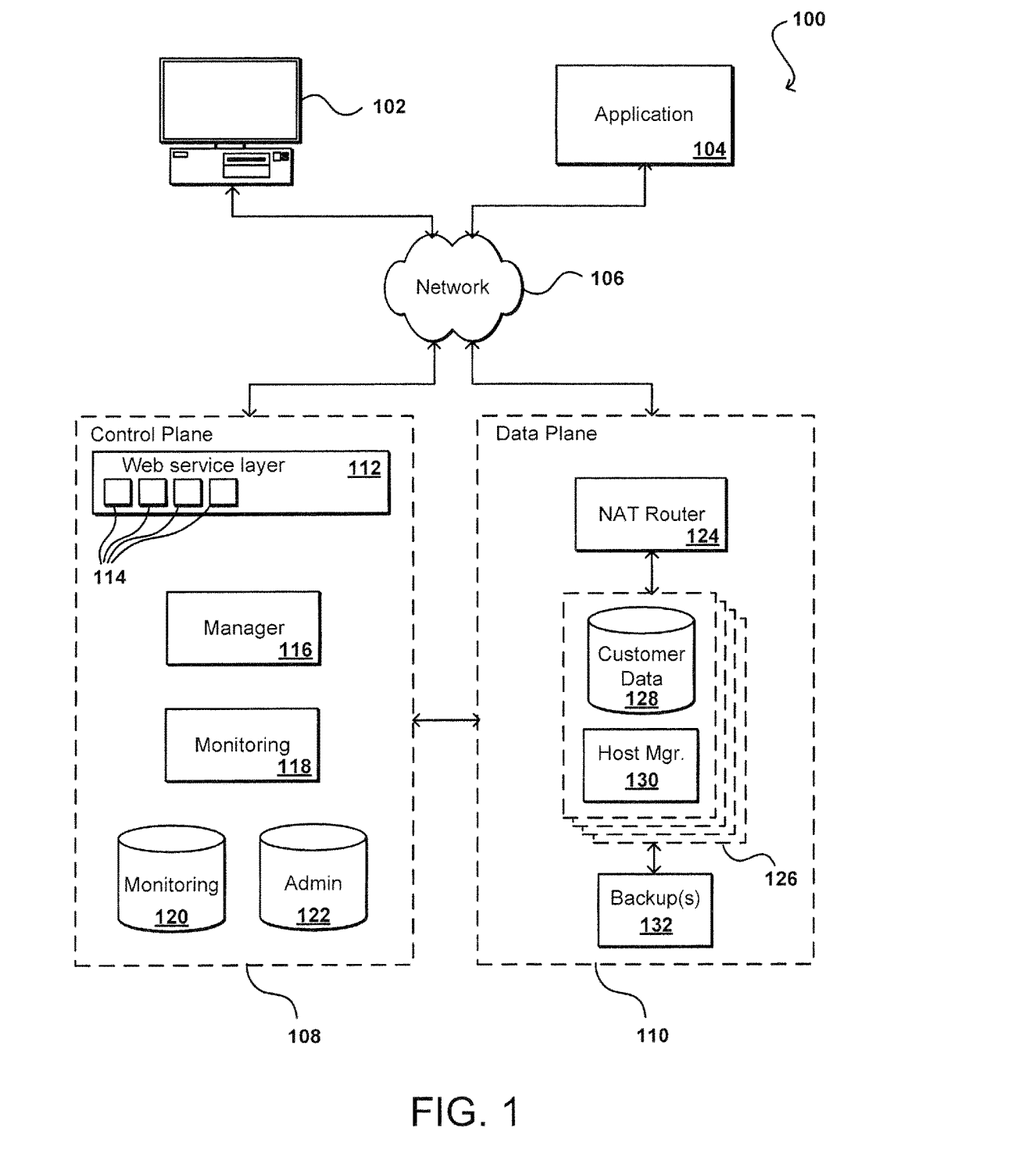
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. In this example, a computing device 102 for an end user is shown to be able to make calls across at least one network 106 to a control plane 108 (or other such access layer) to perform a task such as to obtain access to a specified resource or resource type. The computing device 102 can include any appropriate device known or used for such purposes, as may include client devices such as personal computers, cell phones, handheld messaging devices, laptop computers, set-top boxes, personal data assistants, electronic book readers, and the like. The at least one network can include any appropriate wired and/or wireless network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. While an end user computing device 102 and an application 104 are used for purposes of explanation, it should be understood that any appropriate user, application, service, device, component, or resource can access the interface(s) and components of the control plane and/or data plane as appropriate in the various embodiments. Further, while certain components are grouped into a data "plane" or data "environment," it should be understood that this can refer to an actual or virtual separation of at least some resources (e.g., hardware and/or software) used to provide the respective functionality. Further, the control plane can be considered to be part of the data plane in certain embodiments. While a single control plane is shown in this embodiment, there can be multiple instances of control or access management components or services in other embodiments. A control plane can include any appropriate combination of hardware and/or software, such as at least one server configured with computer-executable instructions. The control plane also can include a set of APIs 114 (or other such interfaces) for receiving Web services calls or other such requests from across the network 106, which a Web services layer 112 can parse or otherwise analyze to determine the steps or actions needed to act on or process the call. For example, a Web service call might be received that includes a request to establish a connection to a data repository for to execute a query for a user. In this example, the Web services layer can parse the request to determine the type of connection or access needed, the appropriate type(s) of resource needed, or other such aspects.

The control plane 108 can include one or more resource managers 116, each responsible for tasks such as validating the user or client associated with the request and obtaining or allocating access to the appropriate resource(s). Such a system can handle various types of requests and can establish various types of connections. Such a system also can handle requests for various types of resources, such as specific graphic processors or other types of hardware or hardware functionality, and can provide access to the appropriate resource(s). Components of the data plane 110, or the resource layer of the cloud, can perform the necessary tasks to provide the resource. Once the resource is provided and/or available for access by the computing device 102, the user can be provided with the DNS address and a port address to be used to access a resource. A user then can access the resource directly in the data plane 110 using the DNS address and port, without having to access or go through the control plane 108.

The control plane 108 in this embodiment also includes at least one monitoring component 118. When a resource is allocated, created, or otherwise made available in the data plane, information for the resource can be written to a data store accessible to the control plane, such as a monitoring data store 120. It should be understood that the monitoring data store can be a separate data store or a portion of another data store. A monitoring component 118 can access the information in the monitoring data store 120 to determine information such as the past usage of resources by various users, a current number or type of threads or resources being allocated to a user, and other such usage information. A monitoring component also can call into components of the data plane 110 to determine information such as the number of active connections for a given user in the data environment and aspects about the usage of each connection. A monitoring component 118 can constantly monitor the usage of each resource by a user, client, etc., having an allocation provided through the connection manager. A monitoring component also can access information stored in an administrative ("Admin") or similar data store 122, which can store information such as the general allocation granted to a user, throttling or limiting information for a user, resource permissions for a user, or any other such information that can be specified and/or updated by an administrator or other such user.

In an example where users request connections to various resources, such as physical or virtual host machines 134, each machine 134 in the data environment can include at least one data store 128 or other type of resident memory or storage, and a host manager component 128. A host manager in one embodiment is an application or software agent executing on a machine, such as a Tomcat or Java application server, programmed to manage tasks such as software deployment and data store operations, as well as monitoring a state of the respective resource. The resource manager 116 can communicate periodically with each host manager 130 for which a connection has been established, or to an administration server or other component of the resource environment, to determine status information such as load, usage, capacity, etc.

As discussed, once a resource is provisioned and a user is provided with an IP address derived from DNS mappings or other address or location, the user can communicate "directly" with components or resources of the data plane 110 through the network in order to directly interact with that resource 126. In various embodiments, as discussed, the data plane takes the form of (or at least includes or is part of) a computing cloud environment, or a set of Web services and resources that provides data storage and access across a "cloud" or dynamic network of hardware and/or software components. A IP address derived from DNS mappings is beneficial in such a dynamic cloud environment, as instance or availability failures, for example, can be masked by programmatically remapping the IP address to any appropriate replacement instance for a use. A request received from a user 102 or application 104, for example, can be directed to a network address translation (NAT) router 124, or other appropriate component, which can direct the request to the actual resource 126 or host corresponding to the mapped address of the request. Such an approach allows for resources to be dynamically moved, updated, replicated, etc., without requiring the user or application to change the IP address or other address used to access the instance. In some cases, a resource 126 such as a data instance can have at least one backup instance 132 or copy in persistent storage.

Figure 2A:
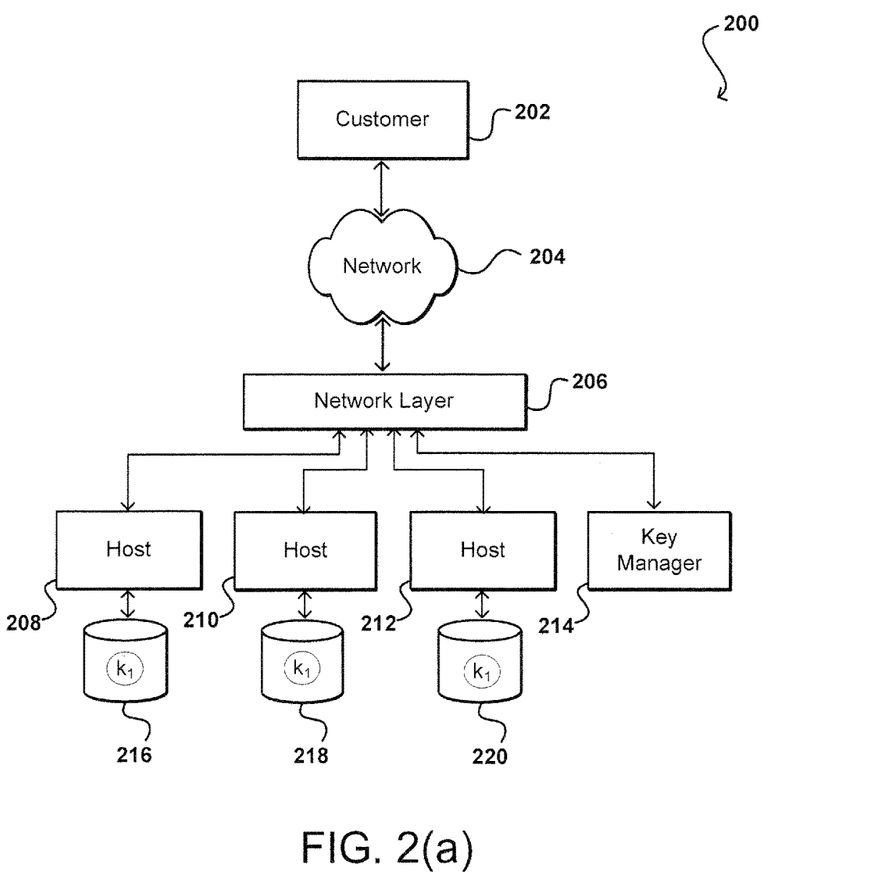
FIGS. 2(a) and 2(b) illustrates an environment and a process for managing encryption keys that can be utilized in accordance with various embodiments.

FIG. 2(a) illustrates an example of a configuration 200 of components that can be used to securely store, transmit, and/or provide access to data, messages, or other such objects in such an environment. In this example, data for a customer 202 can be stored in any of a number of data stores 216, 218, 220 associated with any of a number of hosts 208, 210, 212. The hosts can include any number of hosts of any appropriate type(s) located, logically or geographically, in one or more locations, as is known for a distributed system. When a customer 202 submits a request across at least one network 204 to a resource provider environment, for example, the request can be received to an interface layer 206 that can include components such as application programming interfaces (APIs), routers, switches, Web servers, and the like, and information for the request can be directed to one or more of the hosts 208 for processing, as appropriate. Similarly, applications or services might be running on one or more of the hosts, or elsewhere in or out of the environment, that might want access to the data stored in one of the data stores 216, 218, 220. Similarly, messages might be sent between any or all of these entities, components, or devices that should be encrypted at least for transmission purposes. Various other communications, data objects, or other such entities can be encrypted as well as known for such environments.

As mentioned, one or more secrets can be used to provide the encryption in any of these or other such situations. In at least some embodiments, the security can be provided by encrypting messages or data using one or more cryptographic keys. As an example, a 128 bit encryption key, which can include a string of random characters, for example, can be used to encrypt messages passing between two of the hosts. Each of the hosts can store a copy of the encryption key for use in encrypting and/or decrypting the message. The key can be stored on the host in resident memory or in a data store accessible to the host. When a host wants to send such a message, the host can retrieve the key and use the key to encrypt the message before sending. When another host receives the message, that host can decrypt the message using another copy of the key (assuming the host has access to a copy of the key). Approaches for encrypting and decrypting a message with an encryption key are well known in the art and, as such, will not be discussed herein in detail.

As illustrated, the environment can include a key manager 214, which can be an application, system, or service in various embodiments, which can also be located in the control plane, the data plane, or an external environment in various embodiments. The key manager 214 can be responsible for tasks such as determining an initial sets of keys or credentials, ensuring that each appropriate and/or authorized host or component has a copy of the relevant key(s), rotates the keys at appropriate time, and causes the new keys resulting from the rotation to be pushed to the appropriate keys and/or components. The key manager can also be responsible for notifying appropriate parties of a change in keys, and/or ensuring that data encrypted under an old key is decrypted and re-encrypted under at least one of the new keys.

As mentioned, however, rotating keys can require a significant effort, particularly for large, distributed systems that might be located across multiple locations and/or on multiple networks. In at least some embodiments, the keys are stored in one or more determined locations such that only components with authorized access to those locations can read data, messages, or other information encrypted with those keys. If it is desired to rotate, change, or update one of the keys, the new key would have to be sent to each appropriate location. Further, the data encrypted under the old key would have to be read to somewhere that has the keys, decrypted with the old key(s), re-encrypted with the new key(s), and then stored back to the appropriate location. As should be understood, other types of credentials, secrets, or security information can be used to secure objects across the environment as well within the scope of the various embodiments. Such approaches can be undesirable at least for the fact that a significant amount of data transfer is required, and it is necessary to track and retrieve anything across the environment that has been encrypted using the old key. In some cases, standards require customers to periodically rotate keys, such that this can result in a significant expenditure of resources that may be unavoidable in certain situations. Another potential downside is that fact that if a key is leaked or exposed, all data under that key becomes exposed as well.

Approaches in accordance with various embodiments can attempt to enable the rotation and/or updating of secrets, such as encryption keys, without the need to track and transmit all data encrypted under the old secret(s). While such an approach can be implemented by distributing the old secret and the new secret, any entity receiving and/or gaining access to the secrets can read any data, messages, or other information that was encrypted using either key.

Accordingly, approaches in accordance with various embodiments can enable the keys for encrypted data and other information to be upgraded without exposing the data encrypted under those keys. In at least some embodiments, one or more stream cipher algorithms can be used to generate new keys on demand, as well as intermediate keys used in the key upgrade process. A customer, manager, or other such entity can request that a key be upgraded, and a security manager, key manager, or other such component can cause the new and intermediate keys to be generated and sent to the appropriate locations where data stored under the old key is located. In other embodiments, keys can be scheduled to be rotated at regular intervals, or at other appropriate times, and the new and intermediate keys can be generated and pushed out automatically. In some embodiments, a security manager might receive a new key to be used, and generate an intermediate key to be distributed to the appropriate locations. The intermediate key then can be provided to any location having data stored under the old key, in order to cause the data to be encrypted under the new key.

Various embodiments can take advantage of what are referred to herein as "revocable" stream cipher algorithms.

In cryptography, stream ciphers in general refer to symmetric key ciphers where plaintext digits are combined with a pseudorandom cipher digit keystream, with each plaintext digit being encrypted individually with the corresponding digit of the keystream. As an example, a stream cipher can be thought of as a key generator function G, that when given a key K produces a long, unpredictable keystream KS. A simple XOR (i.e., additive) cipher can be performed on the KS against a message to be encrypted, in order to produce ciphertext. Similarly, given a ciphertext, the stream cipher G can be invoked on the relevant key K to reproduce the keystream KS, when then can have an XOR cipher performed with respect to the ciphertext to produce the decrypted message.

A revocable stream cipher builds on this stream cipher by introducing another function, referred to herein as ReKey. The function ReKey can take a first key $K_1$, such as an old key previously used to encrypt data, and can produce both a second key, $K_2$, and an upgrade key $K_{12}$. Given a ciphertext for a message encrypted with first key $K_1$, the ciphertext can be encrypted with the upgrade (or "intermediate") key $K_{12}$, such as by using an XOR cipher discussed above, which can result in the message being encrypted under the second key. In other words, when the an XOR cipher performed on the generator of the first key with respect to the generator of the intermediate key results in the generator of the second key. The formulae for these processes can be given by:

$$\text{ReKey}(K_1) \rightarrow (K_{12}, K_2)$$

$$G(K_1) \text{XOR} G(K_{12}) = G(K_2)$$

This can also be cast in terms of the encrypt and decrypt functions F and D, respectively:

$$\text{ReKey}(K_1) \rightarrow (K_{12}, K_2)$$

$$D(K_2, E(K_{12}, E(K_1, M))) = M$$

As can be seen, providing the intermediate key enables the message to be encrypted using the second key without ever unencrypting the data, or potentially exposing the old and/or new keys to other parties, as exposing the keys can be potentially more dangerous than not rotating the keys in the first place.

Figure 2B:
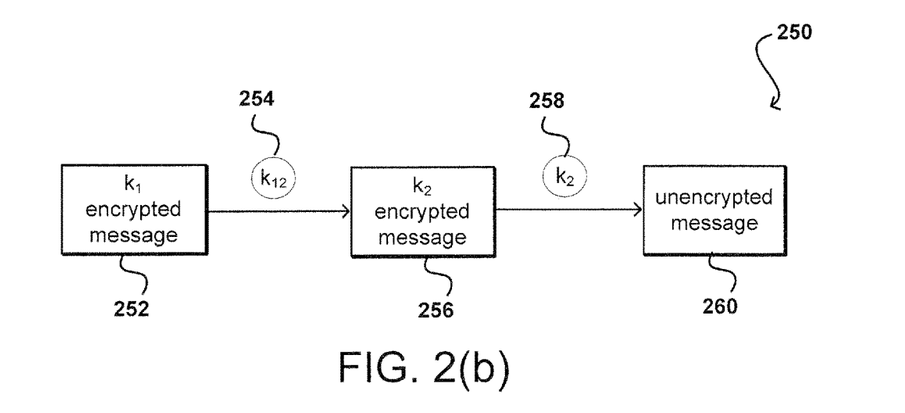

An example of such a process is illustrated in the example 250 of FIG. 2(b). In this example, a message 252 is encrypted with a first key, $K_1$. When that message is subsequently encrypted using an intermediate key 254, $K_{12}$, the resulting message 256 is encrypted under second key, $K_2$. When that message is then encrypted using the second key 258, $K_2$, the result is the original unencrypted message 260.

In some embodiments, other ReKey functions can be utilized as well. For example, the ReKey function can be configured to accept either $K_{12}$ or $K_2$ as a parameter, and produce the remaining key. An example of such a function is given by the following:

$$\text{ReKey}(K_1, K_2) \rightarrow K_{12}$$

$$D(K_2, E(K_{12}, E(K_1, M)) = M$$

As a specific example of one such revocable stream cipher, the set of possible valid keys (or the "key space") can be defined as elements of the set comprising sequences of bytes, each sequence having a length that is an integer multiple of 128 bits (i.e., sequences of 128 bits, 256 bits, 384 bits, etc.). Each 128 bit portion of the key can be a separate 128 bit sub-key. Thus, a given key K in that key space could take the form:

$$K = K_1, \ldots, K_n$$

where each $K_1$ is a 128 bit sub-key. An appropriate stream cipher or generator function G can be selected, which can correspond to any appropriate stream cipher such as RC4, CryptMT, FISH, ISAAC, and Scream, among others. Given G, a generator G' can be constructed for a revocable cipher as follows:

$$ReKey(K) := K_{upgrade} = K_{n+1} \text{(new random 128 bit sub-key)}$$

$$K_2 = K, K_{n+1}$$

And then:

$$G'(K_1 \ldots K_n) = G(K_1) \text{XOR} G(K_{n+1}) \ldots \text{XOR} G(K_n)$$

Thus, each upgrade of the key results in the addition of a random 128 bit sub-key to the previous key, which is itself a set of one or more random 128 bit sub-keys. If K was 512 bits before the upgrade, the additional 128 bit sub-key results in a new key having a length of 640 bits. Such an approach has an advantage that the new key can automatically be produced as part of the process using the intermediate key, without exposing the new key or the unencrypted data. Such an approach might not be appropriate for all embodiments, however, as the decryption time is linear in the number of times the cipher text has been upgraded. Further, decrypting requires a copy of each sub-key ever used for encryption of the data object.

A different approach can provide improved performance, but with the potential to be less secure than the above example. In this approach, the ReKey function could instead be given by:

$$ReKey(K) K_2 = K_{n+1} \text{ (new random sub-key)}$$

$$K_{upgrade} = K \ldots K_2$$

where G' is constructed as above. Such a scheme can provide improved performance, but has the potential for the new key to be extracted from $K_{upgrade}$ and used to decrypt the data.

Thus, a revocable stream cipher as described herein has advantages such as, with a particular set of relationships, the ability to upgrade the encryption of a message or data without having to either transfer the message from the party for decryption and re-encryption, or having to provide the party with the new key in order to enable the party to perform the decryption and re-encryption. Instead, the party can be provided with an intermediate key that, when applied to a message, causes the message to be encrypted under the new, desired key. Such an approach is less resource intensive and more secure than transferring the data, and is also more secure than transmitting the new key to be used to re-encrypt the message. The set of revocable cipher functions capable of performing such actions without ever revealing the initial key can be referred to as a "class" of cipher functions.

In some embodiments upgrade keys can be used that match proper prefixes of the initial key, either randomly or in some sequence. Such an approach enables keys to be optimized out for improved security and/or processing. For example, if two 128 bit sub-keys in a 1,280 bit key are the same, those keys can be canceled out to arrive at a 1,024 bit key that does not include the redundant keys. An XOR cipher will cancel out any equal sub-keys or other such values. In some embodiments, keys can be used that are always twice the length of the previous, underlying generator key. In still other embodiments, the upgrade key can always be twice the size of the generator key, but half the size of the resulting new key. For example, the old key might be 128 bits in length, with the intermediate key being 256 bits that, when processed as discussed herein, results in a new key of 128 bits in length. The upgrade key can be the pairing of the old key and the new key, which does not provide robust security but does suffice to upgrade to the new key with efficient processing.

Figure 3:
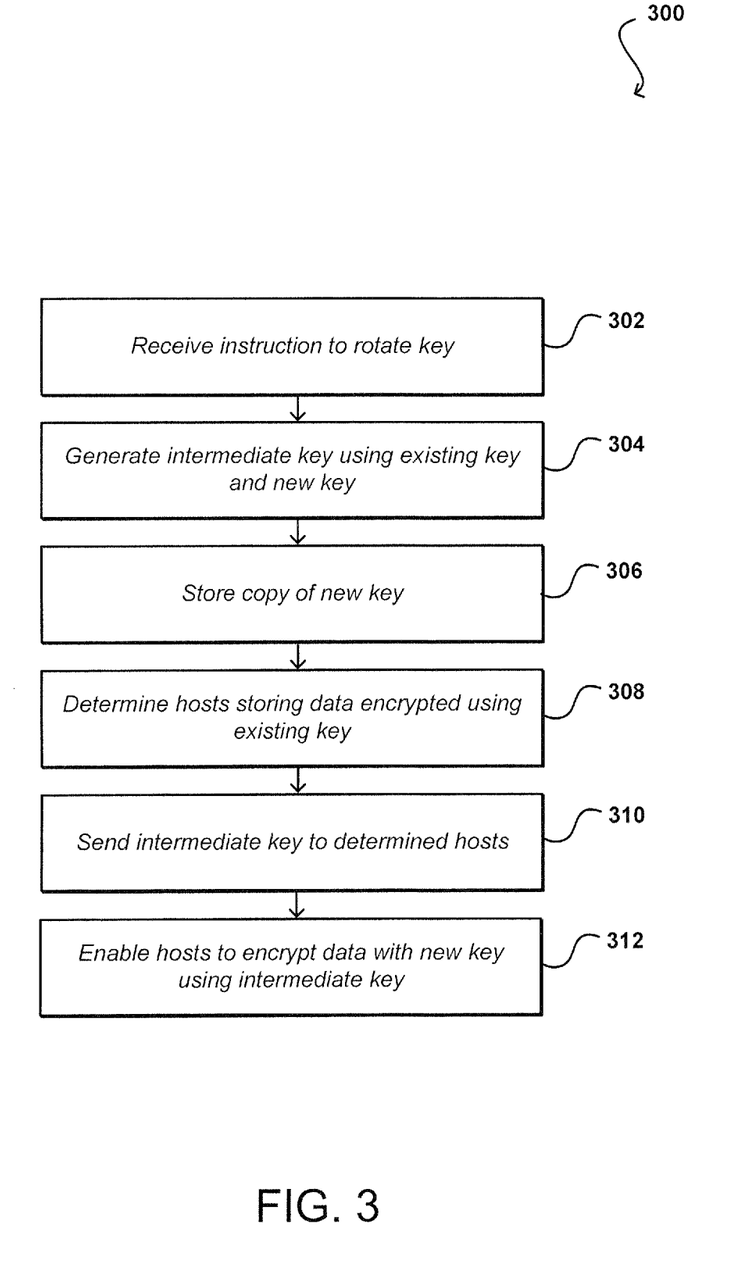
FIG. 3 illustrates an example process for managing encryption of data in a distributed environment that can be used in accordance with various embodiments.

FIG. 3 illustrates an example process 300 for upgrading the encryption of data in a distributed electronic environment that can be utilized in accordance with various embodiments. It should be understood that, for any process discussed herein, there can be additional, fewer, or alternative steps performed in similar or alternative orders, or in parallel, within the scope of the various embodiments unless otherwise specifically stated. Further, various processes discussed herein can be implemented using a general purpose processor and/or an integrated circuit, among other such options. In this example, an instruction is received 302 to rotate a key used to encrypt data across the system. While the term "key" is used for purposes of explanation, it should be understood that other types of secrets, credentials, or security objects can be utilized as well in various embodiments. The instruction can be received from a user, a security manager configured to rotate keys at specific times, or from other appropriate entities. In response, a revocable stream cipher algorithm, ReKey function, or other such approach can be used to generate 304 an intermediate key, which when processed with the old key can generate a determined new key, without ever having to distribute the new key across the system. Information for the new key can be stored 306 in an appropriate location in the distributed system for reference by a security manager or other such component.

The security manager (or another appropriate entity, service, or component) can determine 308 the hosts or other resources across the system that store data encrypted under the old key, that is to be encrypted under the new key. The intermediate key then can be sent 310 to each of these hosts, for example. Each host then can locate the data encrypted under the corresponding old key, and can utilize the intermediate key using a process discussed or suggested herein, which can enable 312 the host to cause the data to be encrypted under the new key, without ever exposing the underlying data or the new key to other entities in the environment. As discussed elsewhere herein, the data is not limited to data stored in a data store, but can include messages received to nodes across the environment or other such data objects. Such an approach also enables data to be stored by entities (internal or external to the environment) that should not have access to the underlying data, as the underlying data will not be exposed outside the encryption.

In some embodiments, at least some of the data might not be re-encrypted using the intermediate keys until an attempt is made to access that data. For example, a security or key manager can generate an intermediate key and send that key to the appropriate locations. Instead of automatically re-encrypting the data with the new key, however, a host manager or other appropriate component can store the intermediate key (and any other related intermediate keys) and only encrypt the data when an attempt is made to access the data and/or the data is to be sent to a different location. A component such as a storage node can store a list of pending upgrade keys, in order to enforce such a late-binding approach, as data might be stored under an old key that might have received multiple upgrades since the data was last accessed, and thus the old key might require multiple "upgrades" in order for the data to be encrypted under the current key without otherwise exposing the data. In other embodiments, at least some authorized hosts might generate the new key from the upgrade key and the old key so the host is always aware of the current key, and then can simply re-encrypt the data when access to that data is to be provided, regardless of the key that was used to encrypt that data. Such an approach looks the same to anyone receiving the data encrypted under the new key, reduces processing requirements, and can increase security as stored data will be encrypted under multiple different keys so a party obtaining a copy of one of those keys will only have limited access to the data, even if that key is the current key.

Figure 4:
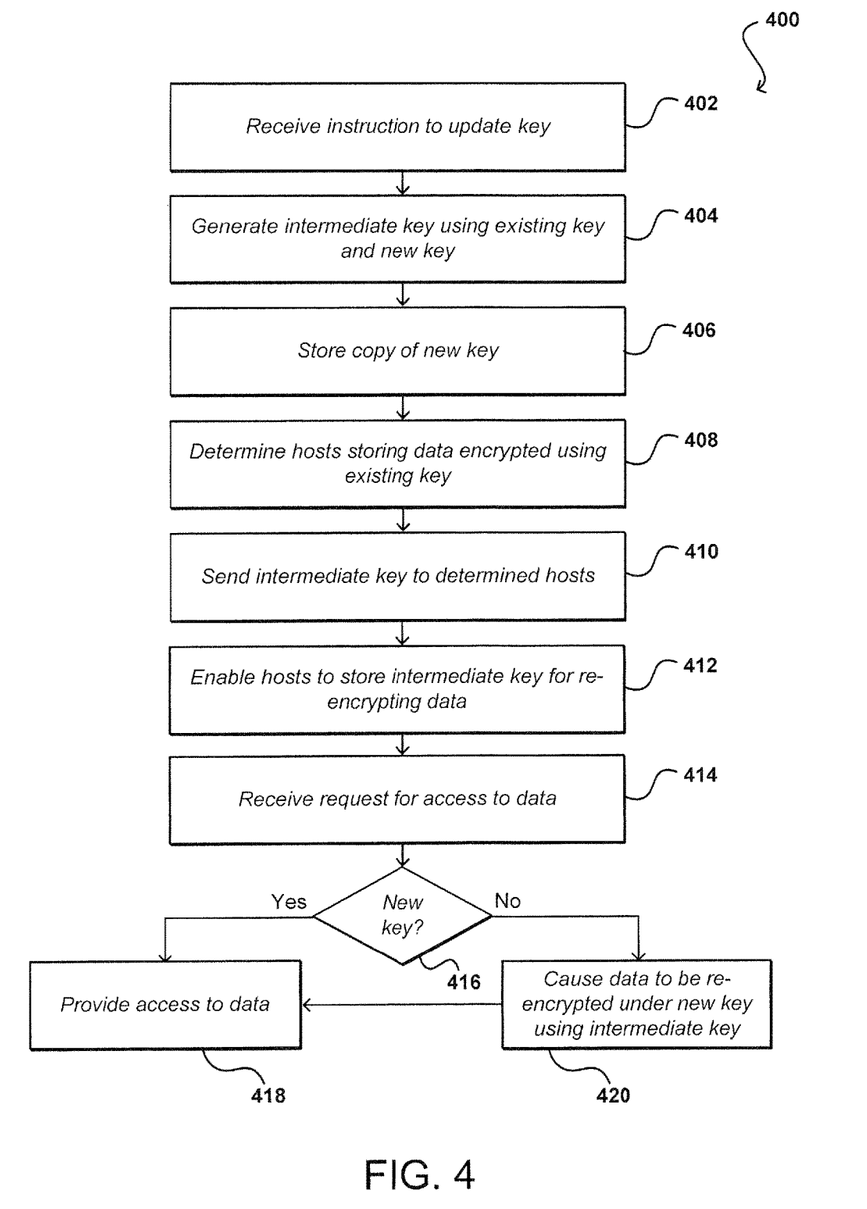
FIG. 4 illustrates an example process for distributing intermediate keys useful to re-encrypt data as needed that can be used in accordance with one embodiment.

FIG. 4 illustrates an example process 400 for updating encryption of data on an as-needed basis that can be utilized in accordance with various embodiments. In this example, an instruction is received 402 to update a key, or other such secret, used to encrypt data in one or more locations across the environment. In response, an intermediate key can be generated 404, as discussed herein, that when processed with an existing key will generate a determined new key and enable the data to be encrypted under the new key without being exposed as unencrypted data. Information for the new key can be stored 406 in an appropriate location in the distributed system for reference by a security manager or other such component.

The security manager (or another appropriate entity, service, or component) can determine 408 the hosts or other resources across the system that store data encrypted under the existing key, that is to be encrypted under the new key. The intermediate key then can be sent 410 to each of these hosts, for example. Each host then can store 412 the intermediate key for use in re-encrypting data stored by, or accessible to, that host. When a request is received 414 to access data, such as to enable access, send a copy, etc., the host can determine 416 whether the data is encrypted under the new/current key. If so, the host can provide 418 the access, assuming any other criteria for the access are satisfied. If not, the host can utilize the intermediate key using a revocable stream cipher-based approach, as discussed herein, to cause the data to be re-encrypted 420 with the new key. The requested access can then be provided, assuming any other criteria are met.

Figure 5:
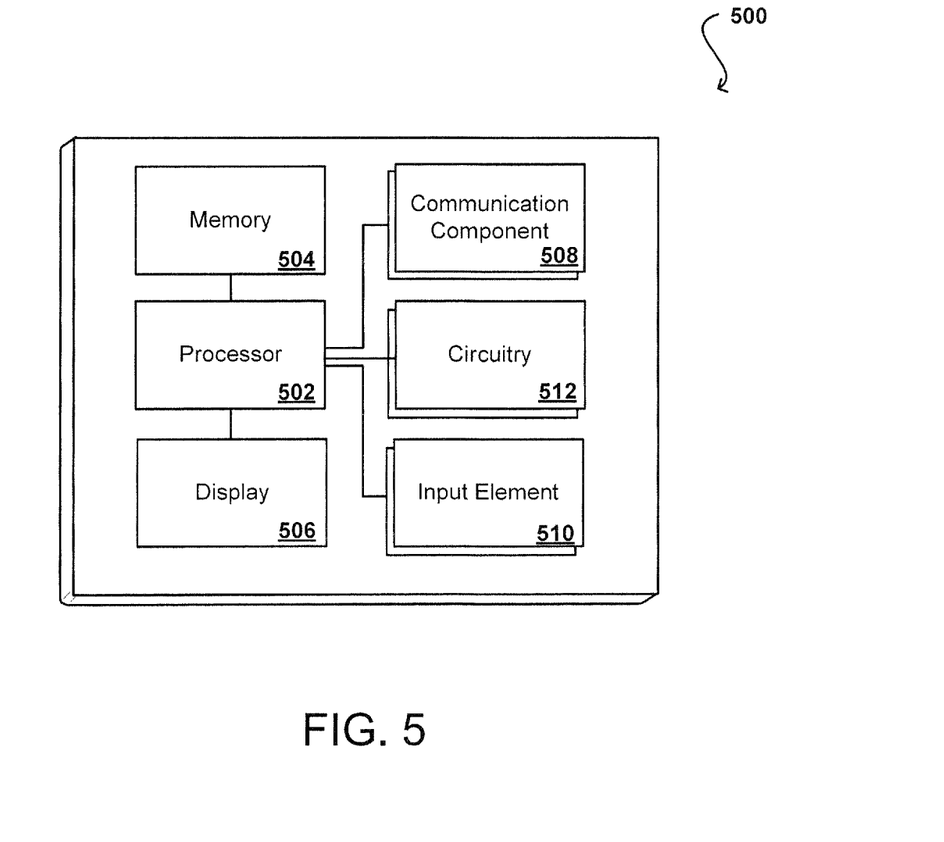
FIG. 5 illustrates a set of components of an example computing device that can be used in accordance with various embodiments.

FIG. 5 illustrates a logical arrangement of a set of general components of an example computing device 500 that can be utilized in accordance with various embodiments. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. At least some of the functionality may also be provided via circuitry 512, which can be configured to perform various processes and actions discussed and suggested herein. The device may include some type of display element 506, such as a touch screen or liquid crystal display (LCD), although devices such as servers or portable media players might convey information via other known elements. In at least some embodiments, the computing device can include one or more networking and/or communication elements 508, such as a Wi-Fi, Bluetooth, RF, wired, or wireless communication system. The device in many embodiments can communicate with a network, such as the Internet, and may be able to communicate with other such devices. In some embodiments the device can include at least one additional input device 510 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIF'S. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
 a plurality of data stores, each data store configured to store data for one or more customers;
 a plurality of host machines, each host machine managing access to at least one of the plurality of data stores; and
 a key manager configured to manage one or more keys used to encrypt at least a portion of the data stored on the one or more data stores, the key manager including at least one processor and instructions that, when executed by the at least one processor, cause the key manager to:
  determine that an existing key of the one or more keys is to be replaced with a new key;
  generate the new key based, at least in part, on a combination of the existing key and an intermediate key;
  identify at least one host machine of the plurality of host machines that manages access to one of the data stores storing data encrypted using the existing key; and
  provide a copy of only the unencrypted intermediate key to the at least one identified host machine in response to a request for access to the data being received, each identified host machine configured to use the intermediate key to cause the data to be encrypted under the new key, wherein the at least one identified host machine utilizes the intermediate key to cause the data to be encrypted under the new key without unencrypting the data in response to a request for access to the data being received.

2. The system of claim 1, wherein the instructions when executed further cause the key manager to:
 generate the new key using a rekeying process.

3. The system of claim 1, wherein the instructions when executed further cause the key manager to:
 determine that the existing key is to be replaced in response to receiving an instruction or reaching a time for rotating the existing key.

4. The system of claim 1, wherein each identified host machine is configured to re-encrypt at least a portion of the data encrypted using the existing key in response to the intermediate key being obtained or a request for access to the portion of the data being received.

5. A system, comprising:
 at least one processor; and
 memory including instructions that, when executed by the at least one processor, cause the system to:
  provide a first encryption key to be used to encrypt data;
  determine that a second encryption key should be used to update encryption of the data;
  generate an intermediate key that, when processed with the first encryption key, produces the second encryption key without transmitting or revealing the second encryption key; and
  provide only the intermediate key to be used to update the encryption of the data in response to receiving a request for access to the data, wherein the encryption of the data is capable of being updated without directly providing the second encryption key or exposing an unencrypted version of the data, wherein at least one host of a plurality of hosts in a distributed environment utilizes the intermediate key to update the encryption of data encrypted under the first encryption key to be encrypted under the second encryption key after processing the first encryption key with the intermediate key without unencrypting the data in response to receiving a request for access to the data.

6. The system of claim 5, wherein the instructions when executed further cause the system to:
obtain the second encryption key by receiving the second encryption key or generating the second encryption key, the second encryption key capable of being generated concurrently with the intermediate key.

7. The system of claim 5, wherein the second encryption key is generated using one of a class of stream cipher algorithms.

8. The system of claim 7, wherein the second encryption key is generated using a revocable stream cipher algorithm.

9. The system of claim 7, wherein the class of stream cipher algorithms produce intermediate keys having a determined pattern relationship with respect to the first encryption key.

10. The system of claim 5, wherein the instructions when executed further cause the system to:
determine the at least one host, wherein providing the intermediate key includes providing the intermediate key to each of the at least one host.

11. The system of claim 5, wherein the instructions when executed further cause the system to:
determine that the second encryption key should be used to update encryption of the data in response to receiving an instruction or reaching a time for rotating the existing key.

12. The system of claim 5, wherein the instructions when executed further cause the system to:
enable a computing device, receiving the intermediate key, to re-encrypt data, encrypted under the first encryption key, in response to receiving the intermediate key or in response to receiving a request for access to the data.

13. The system of claim 5, wherein the instructions when executed further cause the system to:
notify one or more parties associated with the data that encryption of the data has been updated.

14. The system of claim 5, wherein the instructions when executed further cause the system to:
determine a key space of possible key values before generating the intermediate key.

15. A computer-implemented method, comprising:
obtaining a first ciphertext, the first ciphertext generated by encrypting a message under a first key;
obtaining only an upgrade key in response to receiving a request for access to the message, the upgrade key being unencrypted upon transfer and different than the first key, wherein the upgrade key is generated in response to a determination that the first key is to be replaced;
generating a second ciphertext in response to receiving a request for access to the message by encrypting the first ciphertext encrypted under the first key with the upgrade key without unencrypting the message to produce the second ciphertext as encrypted using a second key, the second key being different from the first key or the upgrade key; and
decrypting the second ciphertext with the second key to produce an unencrypted version of the message, the second key being determined at least in part based on the upgrade key.

16. The computer-implemented method of claim 15, wherein the second ciphertext is generated in response to the upgrade key being obtained.

17. The computer-implemented method of claim 15, further comprising:
notifying at least one of a sender or a recipient of the message that encryption of the message has been updated.

18. A non-transitory computer-readable storage medium storing instructions that, when executed by at least one processor of a computing device, cause the computing device to:
receive a first encryption key;
transmit the first encryption key to be used to encrypt data;
determine that the data will be encrypted using a second encryption key;
produce an upgrade key, the upgrade key being different than both the first encryption key and the second encryption key, wherein the upgrade key is used in combination with the first encryption key to enable decryption of the data that is encrypted using the second encryption key;
and transmit only the upgrade key in response to receiving a request for access to the data that was encrypted under the first encryption key, wherein at least one host of a plurality of hosts in a distributed environment utilizes and receives the upgrade key to encrypt the data that was encrypted under the first encryption key without unencrypting the data that was encrypted under the first encryption key to produce data that, when encrypted with the upgrade key, may be decrypted with the second encryption key to yield the data that was originally encrypted under the first encryption key in an unencrypted form in response to receiving a request for access to the data that was encrypted under the first encryption key.

19. The non-transitory computer-readable storage medium of claim 18, wherein the instructions when executed further cause the computing device to:
generate the second encryption key, the second encryption key not determinable from the upgrade key, the second encryption key capable of being generated with, or before, the upgrade key.

20. The non-transitory computer-readable storage medium of claim 18, wherein the instructions when executed further cause the computing device to:
periodically generate additional encryption keys and provide additional upgrade keys for each additional encryption key, whereby the additional upgrade keys are usable to rotate the keys under which the data that was encrypted under the first encryption key is encrypted.

21. The non-transitory computer-readable storage medium of claim 18, wherein the instructions when executed further cause the computing device to:
determine the at least one host; and
provide the upgrade key to each of the at least one host.

22. A computing device, comprising:
at least one processor; memory storing first instructions executable by the processor; and
circuitry configured to perform specified functionality, wherein at least one of the instructions when executed or the functionality when performed by the circuitry enables the computing device to:
receive a first encryption key;

transmit the first encryption key to be used to encrypt data;

determine that the data will be encrypted using a second encryption key;

produce an upgrade key, the upgrade key being different than both the first encryption key and the second encryption key, wherein the upgrade key is used in combination with the first encryption key to enable decryption of the data that is encrypted using the second encryption key; and transmit only the upgrade key in response to receiving a request for access to the data that was encrypted under the first encryption key, wherein at least one host of a plurality of hosts in a distributed environment utilizes and receives the upgrade key to encrypt the data that was encrypted under the first encryption key without unencrypting the data that was encrypted under the first encryption key to produce data that, when encrypted with the upgrade key, may be decrypted with the second encryption key to yield the data that was originally encrypted under the first encryption key in an unencrypted form in response to receiving a request for access to the data that was encrypted under the first encryption key.

23. The computing device of claim 22, wherein the instructions when executed or the functionality when performed by the circuitry enables the computing device to:

determine the at least one host; and provide the upgrade key to each of the at least one host.

24. A generator, comprising:

a processor; and memory including instructions that, when executed by the processor, cause the generator to:

determine an intermediate key;

use the intermediate key to generate an intermediate key stream in response to a request for access to data encrypted under a first key, the intermediate key being different than the first key;

combine the intermediate key stream with an initial key stream generated under the first key to generate a different key stream equal to a key stream generated under a second key, wherein a different key generated by the different key stream can decrypt data encrypted by the second key, without unencrypting data encrypted under the first key, to decrypt the data under the second key in response to a request for access; and transmit only the intermediate key to a device that requested access, the intermediate key being transmitted without being encrypted by either the first key or the second key.

25. The generator of claim 24, wherein the instructions when executed further cause the generator to:

generate the initial key stream using the first key.

26. The generator of claim 24, wherein second key is not determinable from the intermediate key.

* * * * *